United States Patent Office 3,509,096
Patented Apr. 28, 1970

3,509,096
PHENOLIC RESIN PLUS PERCHLORINATED DIPHENYLBENZENE OR POLYPHENYLBENZENE ADDITIVE
Lucien Sobel, Paris, France, assignor to Ugine Kuhlmann, Paris, France, a company of France
No Drawing. Filed Mar. 2, 1967, Ser. No. 619,953
Claims priority, application France, Mar. 3, 1966, 51,802
Int. Cl. C08g 5/10, 5/14, 5/16
U.S. Cl. 260—51.5      11 Claims

ABSTRACT OF THE DISCLOSURE

A phenolic resin is prepared by condensing a phenol and an aldehyde with an additive selected from diphenyl and polychlorinated polyphenylbenzene derivatives containing two or more hydroxy and/or amino groups. Suitable additives include N,N′bis(ethane-2-ol)diaminooctachlorodiphenyl; bis(hydroxyethoxy)octachlorodiphenyl, octachlorodihydroxydiphenyl; N,N′bis(ethyl-2-amino)-diaminooctachlorodiphenyl; bis(dimethylol - 2,2 butoxy-1) octachlorodiphenyl, N,N′bis(ethane - 2-ol)diaminododecachloroparaterphenyl;    1,1′(hexachlorobiphenylylene)bis (diethylenetriamine).

BACKGROUND OF THE INVENTION

Field of the invention

This invention relates to phenolic resins and more particularly, to phenolic resins having therein as an additive, a polyphenyl derivative containing two or more hydroxy and/or amino groups.

DESCRIPTION OF THE PRIOR ART

Phenolic resins are well known and are prepared generally by condensing in an acidic or alkaline medium, a phenol or a phenolic mixture selected from aryl oxygen compounds such as phenol, cresols, xylenols and resorcinols with an aldehyde such as formaldehyde or furfural to which there can be added a certain quantity of amino derivatives such as urea, melamine and the like. These resins are often modified for the purpose of giving to them desired properties such as solubility in oils or in fatty varnishes. These modifications are achieved by using additives such as cellophane, propyl, butyl and hexyl alcohols, partial ethers of polyols, and alkyd resins having free alcohol functional groups and the like.

SUMMARY OF THE INVENTION

I have found phenolic resinous compositions with excellent properties can be prepared by adding to the acidic or the alkaline medium, during the condensation of a phenol and an aldehyde, a diphenyl or a polychlorinated polyphenylbenzene derivative containing at least two radicals selected from the class consisting of amino and hydroxy groups, in an amount equivalent to at least about 5% by weight of the final resinous product.

Preferably the polychlorinated polyphenylbenzene derivatives are the perchlorinated compounds whereby a higher percentage of chlorine is introduced into the phenolic resin.

DESCRIPTION OF THE PREFERRED EMBODIMENT

A large number of diphenyl and polychlorinated polyphenylbenzene derivatives are suitable as additives for the phenolic resins of this invention. Among them, for example, are the polyhydroxy and polyamino compounds of the following formulas:

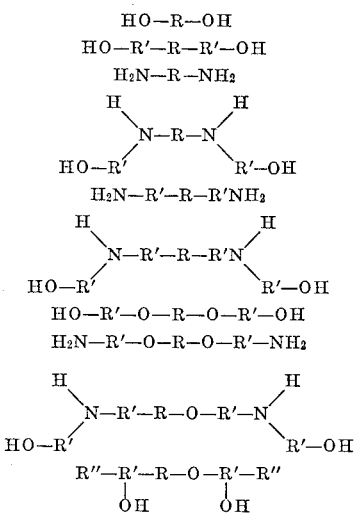

wherein R is a diphenyl or a polychlorinated polyphenylbenzene divalent radical, and R′ and R″ each is an aliphatic, a cyclic or a heterocyclic radical and each of which may be chlorinated.

Specific compounds that I found to be eminently suitable for the preparation of phenolic resins of this invention include the following:

(a) N,N′bis(hydroxydiaminooctachlorodiphenyl and more particularly, N,N′bis(ethane-2-ol)diaminooctachlorodiphenyl;

(b) Bis(hydroxyalkoxy)octachlorodiphenyl and, more particularly, bis(hydroxyethoxy)octachlorodiphenyl;

(c) Octachlorodihydroxydiphenyl;

(d) N,N′bis(ethyl-2-amino)diaminooctachlorodiphenyl;

(e) Bis(dimethylol-2,2-butoxy-1)octachlorodiphenyl;

(f) N,N′bis(ethane - 2-ol)diaminododecachloroparaterphenyl; and (g)   1,1′(hexachlorobiphenylylene)bis(diethylenetriamine).

Preparation of some of these compounds and other diphenyl and polychlorinated polyphenylbenzene derivatives that are suitable for the present invention are described in detail in various French patents and particularly French Patents Nos. 1,279,331, 1,294,146, 1,332,697, 1,336,208, 1,357,100 and 1,389,619.

The amount of polyphenyl additives that can be used to prepare the phenolic resins of this invention may vary within a wide range. I found the amount of the additive that can be used must be equivalent to at least about 5% by weight of the final product in order to influence the phenol-aldehyde resin appreciably and to impart the desired properties thereon. There does not appear to be an upper limit as to how much additive that can be used. The higher the percentage of the polyphenyl additive in the final product, the more it will be plasticized and chlorinated. The final properties of the resin also depend on the molar ratio of various constituents used and on the degree of condensation of the resin produced.

The preparation of phenolic resins by condensing a phenol and an aldehyde in an acidic or an alkaline medium is well known in the art, detail description of which is not necessary. According to the present invention, a polyphenyl additive of the type described hereinabove is added in the reaction medium during the condensation of the phenol and aldehyde. To illustrate the process for preparing the phenolic resins of this invention which con-

Example 1

470 g. of phenol, 75 g. of N,N'bis(ethane-2-ol)diaminooctachlorodiphenyl and 700 g. of 30% (by weight) formaldehyde were charged into a reactor. The pH of the mixture was raised to about 9 by the addition of 0.1 N NaOH solution. The temperature was then raised to 90° C., at which temperature condensation was effected. The reaction was allowed to proceed until a 2% free formaldehyde content was reached. The time required was approximately 1 hour and 30 minutes. The mixture, after neutralizing to a pH of about 7 with hydrochloric acid, was distilled. A phenolic resin having a viscosity of 12,000 centipoises at 20° C. was obtained which represented a dry content of 78%. This resin had a setting time of 1 minute and 50 seconds at 150° C.

Example 2

350 g. of phenol, 100 g. of cresols and 120 g. of bis-(hydroxyethoxy)octachlorodiphenyl and 600 g. of 30% (by weight) formaldehyde were charged into a reactor. The condensation was effected at 95° C. for one hour and 20 minutes until a 2.4% content of free formaldehyde was obtained. The mixture, after neutralizing to a pH of about 7 with hydrochloric acid, was distilled. A phenolic resin having a viscosity of 9,500 centipoises at 20° C. was obtained which represented a dry content of 72%. This resin had a setting time of 2 minutes and 10 seconds at 150° C.

Example 3

250 g. of phenol, 80 g. of vinsol (a complex product obtained by the decomposition of pine stems), 90 g. of N,N'-bis(ethane - 2 - ol)diaminooctachlorodiphenyl and 850 g. of 30% (by weight) formaldehyde were charged into a reactor. The mixture was raised to a pH of about 9 by the addition of a 0.1 NaOH solution. The temperature was then raised to 85° C., at which temperature condensation was effected. The reaction was allowed to proceed until a 2.75% free formaldehyde content was reached which required 2 hours and 20 minutes. The reaction mixture was neutralized to a pH of about 7 with hydrochloric acid and then was distilled. A phenolic resin having a viscosity of 13,000 centipoises at 20° C. was obtained, which represented a dry content of 82%. This resin had a setting time of 2 minutes and 50 seconds at 150° C.

Example 4

1780 g. of phenol and 1800 g. of 30% (by weight) formaldehyde and 180 g. of N,N'bis(ethane-2-ol)diaminooctachlorodiphenyl were charged into a reactor. The pH of the mixture was initially 3.6. 5 cc. of 18% hydrochloric acid was then added to lower the pH to about 1.4. The temperature was then raised within 45 minutes to 100° C. by refluxing and after which the temperature was held at this level for 1 hour and 20 minutes. The reaction mixture obtained had an aqueous upper layer in which the percentage of free formaldehyde amounted to 16.7%. The lower organic layer had 8.8% free formaldehyde and a viscosity of 835 centipoises at 20° C., which was distilled under vacuum at a pressure of 60 mm. Hg. The vacuum was gradually released during the distillation so as to return to normal atmospheric pressure. The temperature which was 30° C. at the start of the distillation was raised to 145° C. at the end thereof. The resulting phenolic resin, generally called novolac, was then poured into a vessel where it set into a mass. A solid mass thus obtained, which was of a reddish brown color, was ground into particles. The mass had a phenol content of 4.4% and a water content of 2.2%. All percentages are percents by weight.

Example 5

1800 g. of phenol, 1800 g. of 30% (by weight) formaldehyde and 450 g. of bis(hydroxyethoxy)octachlorodiphenyl were charged into a reactor. The pH was initially 3.3. 6 cc. of 18% hydrochloric acid were added to the mixture to lower the pH to 1.3. The temperature was then raised by refluxing over a period of 55 minutes to about 100° C. and condensation was permitted to carry out at this temperature for 1 hour and 50 minutes. The reactions mixture obtained had an aqueous layer containing 10.3% free formaldehyde. The lower organic layer had 6% free formaldehyde which was distilled under vacuum at a pressure of 60 mm. Hg. The vacuum was gradually released until it reached normal atmospheric pressure. The temperature was 25° C. at the start and was raised to 150° C. at the end of the distillation. The phenolic resin of the novolac type was then poured while hot into a vessel where it set into a mass. The resulting resin was solid and with a dark brown color.

Example 6

500 g. of phenol, 70 g. of octachlorodihydroxydiphenyl and 750 g. of 30% (by weight) formaldehyde was charged into a reactor. The pH of the mixture was raised to about 8.5 by the addition of a 0.1 N NaOH solution. The resulting mixture was heated to 90° C. and was allowed to condense at that temperature until a free formaldehyde content of 1.5% was obtained. This process took 2 hours and 10 minutes. The reaction mixture was then neutralized to a pH of about 7 by the addition of a suitable amount of hydrochloric acid and the mixture thus obtained was distilled. A resin having a viscosity of 15,000 centipoises at 20° C. was obtained which represented a dry content of 80%.

Example 7

460 g. of phenol, 75 g. of N,N'bis(ethyl-2-amino)diaminooctachlorodiphenyl and 800 g. of 30% (by weight) formaldehyde was charged into a reactor. The pH of the mixture was raised to about 9 by the addition of a 0.1 N NaOH solution. The mixture thus obtained was heated to 100° C. and condensation was allowed to proceed at this temperature until a free formaldehyde content of 3% was reached which required 1 hour and 45 minutes. The product was neutralized to a pH of about 7 with hydrochloric acid, and after which it was distilled. A resin having a viscosity of 16,000 centipoises at 20° C. was obtained, which represented a dry content of 75%.

Example 8

600 g. of phenol, 165 g. of bis(dimethylol-2-butoxy-1)octachlorodiphenyl and 970 g. of 30% (by weight) formaldehyde were charged into the reactor. The pH of the mixture was raised to about 9 by the addition of a 0.1 N NaOH solution. The mixture thus obtained was heated to 95° C. and condensation was allowed to proceed at this temperature until a free formaldehyde content of 2% was obtained, which required 2 hours and 30 minutes. The pH was subsequently lowered to about 7.5 with hydrochloric acid and the resulting product was distilled. In this way, a resin having a viscosity of 13,000 centipoises at 20° C. was obtained which represented a dry content of 75%.

Example 9

450 g. of phenol, 65 g. of N,N'bis(ethane-2-ol)diaminododecachloroparaterphenyl and 700 g. of 30% (by weight) formaldehyde were charged into a reactor. The pH of the mixture was raised to about 8.5 with a 0.1 N NaOH solution and then was heated to 100° C. The condensation was allowed to proceed at this temperature until a free formaldehyde content of 1.8% was reached which required 1 hour and 45 minutes. The pH was then lowered to about 8 using hydrochloric acid and the product was distilled. A resin having a viscosity of 18,000 centipoises at 20° C. was obtained, which represented a dry content of 82%.

I claim:
1. A phenolic resin comprising a phenol-aldehyde con- densate and at least about 5% by weight of the phenolic resin of an additive selected from perchlorinated diphenyl and perchlorinated polyphenylbenzene derivatives each containing at least two radicals selected from the class consisting of amino and hydroxy groups, said additive being added thereto during the condensation of the phenol aldehyde.

2. A phenolic resin of claim 1 wherein the additive is selected from the class of compounds having the following formulas:

(a)         HO—R—OH
(b)         HO—R'—R—R'—OH
(c)         H$_2$N—R—NH$_2$
(d)

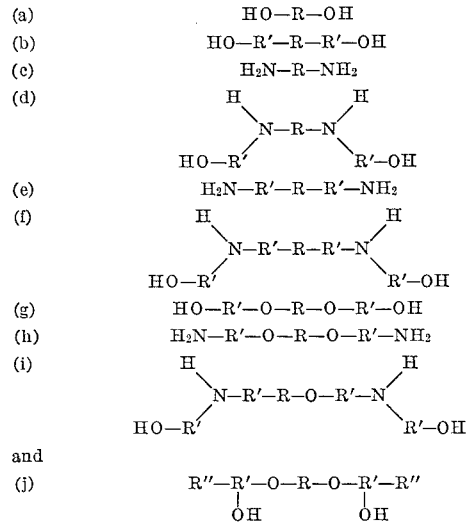

(e)         H$_2$N—R'—R—R'—NH$_2$
(f)

(g)         HO—R'—O—R—O—R'—OH
(h)         H$_2$N—R'—O—R—O—R'—NH$_2$
(i)

and (j)         R''—R'—O—R—O—R'—R''
                        |           |
                        OH     OH wherein R is a perchlorinated diphenyl or a perchlorinated polyphenylbenzene divalent radical, R' and R'' each is an aliphatic, a cyclic, or a heterocyclic radical or its chlorinated derivative.

3. A phenolic resin of claim 1 wherein the additive is N,N'bis(ethane-2-ol)diaminooctachlorodiphenyl.

4. A phenolic resin of claim 1 wherein the additive is bis(hydroxyethoxy)octachlorodiphenyl.

5. A phenolic resin of claim 1 wherein the additive is octachlorodihydroxydiphenyl.

6. A phenolic resin of claim 1 wherein the additive is N,N'bis(ethyl-2-amino)diaminooctachlorodiphenyl.

7. A phenolic resin of claim 1 wherein the additive is bis(dimethylol-2,2-butoxy-1)octachlorodiphenyl.

8. A phenolic resin of claim 1 wherein the additive is N,N'bis(ethane-2-ol)diaminododecachloroparaterphenyl.

9. A phenolic resin of claim 1 wherein the additive is 1,1'(hexachlorobiphenylylene)bis(diethylenetriamine).

10. A process for preparing a phenolic resin which comprises condensing a phenol and an aldehyde and adding thereto during the condensation of the phenol and the aldehyde at least about 5% by weight of the phenolic resin of an additive selected from perchlorinated diphenyl and perchlorinated polyphenylbenzene derivatives each containing at least two radicals selected from the class consisting of amino and hydroxy groups.

11. A process according to claim 10 wherein the additive is selected from the class of compounds having the following formulas:

(a)         HO—R—OH
(b)         HO—R'—R—R'—OH
(c)         H$_2$N—R—NH$_2$
(d)

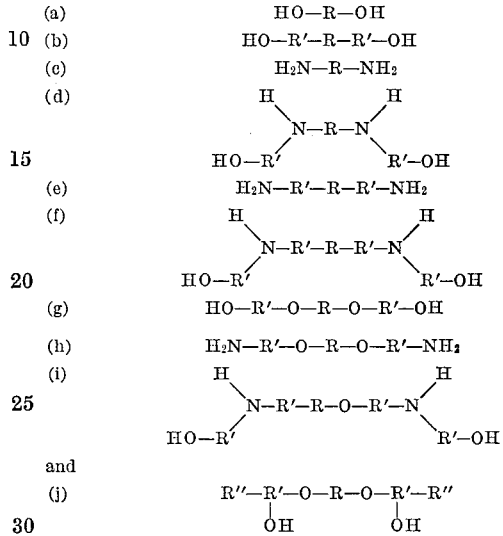

(e)         H$_2$N—R'—R—R'—NH$_2$
(f)

(g)         HO—R'—O—R—O—R'—OH
(h)         H$_2$N—R'—O—R—O—R'—NH$_2$
(i)

and (j)         R''—R'—O—R—O—R'—R''
                        |           |
                        OH     OH wherein R is a perchlorinated diphenyl or a polychlorinated polyphenylbenzene divalent radical, R' and R'' each is an aliphatic, a cyclic or a heterocyclic radical or its chlorinated derivative.

References Cited

UNITED STATES PATENTS

| | | | |
|---|---|---|---|
| Re. 13,531 | 2/1913 | Aylsworth | 260—33.4 |
| 2,431,011 | 11/1947 | Zimmer et al. | 252—51 |
| 2,535,380 | 12/1950 | Adams et al. | 161—198 |
| 3,218,286 | 11/1965 | Fusco et al. | 260—33.6 |
| 3,316,140 | 4/1967 | Sonnabend | 161—198 |
| 3,369,056 | 2/1968 | Schwarzer | 260—838 |
| 2,382,238 | 8/1945 | Laufenberg et al. | 260—14 |

WILLIAM SHORT, Primary Examiner

HOWARD SCHAIN, Assistant Examiner

U.S. Cl. X.R.

260—32.6, 33.4, 51, 57, 58, 59